3,373,097
METHOD FOR SEPARATION OF A METAL-CONTAINING HALIDE PHASE FROM A GANGUE-CONTAINING SILICATE PHASE AND ELECTROLYSIS OF HALIDE PHASE TO OBTAIN THE METAL
John M. Gomes, Don H. Baker, Jr., and Kenji Uchida, Reno, Nev., assignors to the United States of America as represented by the Secretary of the Interior
No Drawing. Filed Feb. 16, 1965, Ser. No. 433,229
9 Claims. (Cl. 204—64)

The invention herein described and claimed may be manufactured and used by or for the Government of the United States of America for governmental purposes without the payment of royalties thereon or therefor.

This invention relates to separation of metals, particularly tungsten, from minerals containing them.

Economic sources of tungsten in the United States are scheelite ($CaWO_4$) and wolframite group (chiefly $MnWO_4$ and $FeWO_4$) minerals, the major domestic source being scheelite. Increasing concentration of impurities (gangue) is the major obstacle in electrowinning of tungsten from crude feed materials dissolved in molten electrolytes, e.g., increased quantities of calcium in the electrolyte causes increased alkalinity, viscosity and co-deposition of minor metallic impurities and the interstitial impurities carbon and oxygen. Removal of the bulk of objectionable impurities by a simple, selective separation prior to electrolysis would increase the yield of high purity tungsten metal and extend the life of the electrolyte.

It has now been found that such a separation may be achieved by means of a selective molten phase separation in which the tungsten, in the form of $WO_3$, is retained in an upper halide phase and the impurity elements such as Ca, Mn or Fe are recovered in a lower silicate phase.

Starting materials in the process of the invention will generally be commercial grade scheelite or wolframite concentrates. Commercial grade salts (halide and silicate) are added and the mixture heated to a temperature and for a time sufficient to form the molten phases. The phase separation takes place in about one-quarter of an hour, but a more complete transfer of the calcium, iron, or manganese to the lower phase is obtained if the melt is held at temperature for about 1 hour. Optimum temperature will vary with the starting material and salts employed. In the case of scheelite ores a temperature of about 900° to 1100° C. is used.

Examples of suitable halide salts are sodium chloride, potassium chloride, sodium fluoride, sodium aluminum fluoride (cryolite) and potassium aluminum tetrafluoride. Mixtures of these salts may also be used.

Sodium silicate has been found most satisfactory for forming the lower solvent phase; however, other alkali silicates may be used. This salt extracts the calcium oxide, iron oxide or manganese oxide, depending on the composition of the feed material.

It has also been found that addition of aluminum oxide (Example 5) improves retention of calcium in the lower phase.

Optimum amounts of halide and silicate salts will also vary with the types of feed material as well as the specific salts employed. Generally, good separation is obtained if the mole ratio of sodium silicate to $CaWO_4$ (or $FeWO_4$, $MnWO_4$) ranges from about 1.5 to 1.0 to 3.5 to 1.0. A sufficient quantity of halogen salts is used to yield an upper phase containing between 15 and 30 weight percent $WO_3$. The mole ratio of halogen salt to $CaWO_4$ will generally range from about 5.0 to 10.0.

The granular or powdered reagents are added to a suitable crucible, usually graphite, and heated to the required temperature (about 900 to 1100° C.). The charge is held at this temperature for a time (usually about 1 hour) sufficient to form the separate phases. The phases are then separated by simple decantation, the upper more fluid phase being poured into a second graphite crucible. The lower silicate phase is poured into a separate vessel, usually a cast iron pot.

Following phase separation, the tungsten is recovered from the halide phase by conventional electrolysis. Typically, the halide phase is returned to the furnace and an alkali cryolite added to the molten bath to form a suitable electrolyte. An alkali phosphate or borate may be used in place of the cryolite in formation of a stable electrolyte. The graphite crucible serves as anode and a centrally positioned graphite or tungsten cathode is submerged in the bath. Suitable electrolytic conditions, for tungsten deposition, are a temperature of 750° to 1000° C. and a cathode current density of 50 to 300 amps. per square decimeter. Electrolysis is continued until the $WO_3$ content of the bath is about 2 to 3%, after which the electrodeposited tungsten is withdrawn from the cell and cleaned by standard leaching techniques.

The depleted electrolyte can be used for subsequent phase separation by adding additional sodium silicate and ore concentrates to the molten electrolyte. The method of the invention is capable of yielding electrolytic metal that is at least 99.5 percent tungsten.

Iron and manganese contained in the lower phase during treatment of wolframite group feed materials can be reduced by conventional methods to an iron-manganese alloy.

Although the process of the invention has been found particularly applicable to tungsten minerals, it may be used to recover other metals from their minerals. Examples of such other metals are Group IV–B metals (Ti, Zr, Hf, Th), Group V–B metals (V, Cb, Ta) and Group VII–B metals (Mn, Re).

The invention will be more specifically illustrated by the following examples.

EXAMPLE 1

Scheelite concentrate—feed material: $WO_3=73.0\%$, $CaO=19.6\%$.

*Phase separation*

Molten bath:                                  Weight percent
  $CaWO_4$ ------------------------------------ 32.0
  $Na_2SiO_3$ --------------------------------- 20.0
  NaCl ---------------------------------------- 27.0
  NaF -----------------------------------------15.0
  $KAlF_4$ ------------------------------------- 6.0

100.0

$$\text{Mole ratio } \frac{Na_2SiO_3}{CaWO_4} = 1.5$$

$$\text{Wt. ratio } \frac{\text{Halide Salts}}{WO_3} = 2.0$$

Temp. 1,050° C.

| Results | | Analysis, percent | | Distribution, percent | |
|---|---|---|---|---|---|
| Phase | Wt. percent | $WO_3$ | CaO | $WO_3$ | CaO |
| Upper | 70 | 29.2 | 1.6 | 99.0 | 24 |
| Lower | 30 | 1.0 | 17.3 | 1.0 | 76 |

*Electrolysis.*—Temp. 90° C. C.D.=150 a./dm.$_2$. 10 wt. percent KAlF$_4$ added to upper phase after separation.

Analysis of deposited tungsten: P.p.m.
- Al _____ <5
- Ca _____ <20
- Cu _____ <25
- Fe _____ 150
- Ni _____ <10
- Si _____ 20
- C _____ 800
- O$_2$ _____ 400

EXAMPLE 2

Scheelite concentrate—feed material: WO$_3$=73.0; CaO=19.6%.

Molten bath: Weight percent
- CaWO$_4$ _____ 23.0
- Na$_2$SiO$_3$ _____ 29.0
- KCl _____ 40.0
- Na$_3$AlF$_6$ _____ 8.0

Mole ratio $\frac{Na_2SiO_3}{CaWO_4}=3$

Wt. ratio $\frac{Halide\ salts}{WO_3}=2.9$

Temp. 1,050° C.

| Results | | Analysis, percent | | Distribution, percent | |
|---|---|---|---|---|---|
| Phase | Wt. percent | WO$_3$ | CaO | WO$_3$ | CaO |
| Upper | 68.5 | 21.2 | 0.7 | 99.2 | 9.2 |
| Lower | 31.5 | 0.4 | 14.3 | 0.8 | 90.8 |

*Electrolysis.*—Temp. 1,000° C. C.D.=150 a./dm.$_2$. 10 wt. percent Na$_3$AlF$_6$ added to upper phase after separation.

Analysis of deposited tungsten: P.p.m.
- Al _____ 10
- Ca _____ <20
- Cu _____ 50
- Fe _____ 80
- Ni _____ <10
- Si _____ <15
- C _____ 3400
- O _____ 320

EXAMPLE 3

Huebnerite concentrate—feed material: WO$_3$=67.7%, FeO=9.0%, MnO=20.6%, Cb$_2$O$_5$=2.3%.

*Phase separation*

Molten bath: Weight percent
- (MnFe)WO$_4$ _____ 26.0
- Na$_2$SiO$_3$ _____ 20.0
- NaCl _____ 35.0
- NaF _____ 19.0

100.0

Mole ratio $\frac{Na_2SiO_3}{(MnFe)WO_4}=1.5$

Wt. ratio $\frac{Halide\ Salts}{WO_3}=3.1$

Temp. 1,050° C.

| Results | | Analysis, percent | | | | Distribution, percent | | | |
|---|---|---|---|---|---|---|---|---|---|
| Phase | Wt. percent | WO$_3$ | MnO | FeO | Cb$_2$O$_5$ | WO$_3$ | MnO | FeO | Cb$_2$O$_5$ |
| Upper | 71.5 | 22.0 | 0.3 | 0.1 | 0.1 | 98.5 | 4.7 | 7.5 | 24.0 |
| Lower | 28.5 | 0.8 | 16.1 | 3.1 | 0.8 | 1.5 | 95.3 | 92.5 | 76.0 |

*Electrolysis.*—Temp. 1,000° C, C.D. 150 a./dm.$_2$. Added 10 wt. percent KAlF$_4$ to upper phase after separation.

Analysis of deposited tungsten:
- Al _____ 30
- Ca _____ 20
- Cu _____ <25
- Fe _____ 175
- Mn _____ 2
- Ni _____ 30
- Si _____ <15
- C _____ 1400
- O _____ 270

EXAMPLE 4

Wolframite concentrate—feed material: WO$_3$=73.6%, FeO=16.4%.

*Phase separation*

Molten bath: Weight percent
- (FeMn)WO$_4$ _____ 23.0
- Na$_2$SiO$_3$ _____ 19.0
- KCl _____ 58.0

100.0

Mole ratio $\frac{Na_2SiO_3}{(FeMn)WO_4}=2.0$

Wt. ratio $\frac{Halide\ Salts}{WO_3}=3.4$

Temp. 1,050° C.

| Results | | Analysis, percent | | Distribution, percent | |
|---|---|---|---|---|---|
| Phase | Wt. percent | WO$_3$ | CaO | WO$_3$ | CaO |
| Upper | 76.0 | 18.0 | 0.1 | 99.0 | 2.7 |
| Lower | 24.0 | 0.5 | 15.0 | 1.0 | 97.3 |

*Electrolysis.*—Temp. 1,000° C, C.D.=150 a./dm.$_2$. 10 wt. percent Na$_3$AlF$_6$ added to upper phase after separation.

Analysis of deposited tungsten:
- Al _____ 25
- Ca _____ 20
- Cu _____ 50
- Fe _____ 80
- Mn _____ 15
- Ni _____ <10
- Si _____ 15
- C _____ 3700
- O _____ 210

EXAMPLE 5

Scheelite concentrate—feed material: WO$_3$=73.0%, CaO=19.6%.

*Phase separation*

Molten bath: Weight percent
- CaWO$_4$ _____ 27.0
- Na$_2$SiO$_3$ _____ 35.0
- NaCl _____ 23.0
- NaF _____ 13.0
- Al$_2$O$_3$ _____ 2.0

100.0

Mole ratio $\dfrac{Na_2SiO_3}{CaWO_4} = 3$

Wt. ratio $\dfrac{\text{Halide Salts}}{WO_3} = 1.8$

Temp. 1,070° C.

| Results | | Analysis, Percent | | | Distribution, Percent | | |
|---|---|---|---|---|---|---|---|
| Phase | Wt. Percent | $WO_3$ | CaO | $Al_2O_3$ | $WO_3$ | CaO | $Al_2O_3$ |
| Upper | 60 | 33.3 | 0.80 | 0.04 | 97.4 | 9.6 | 0.5 |
| Lower | 40 | 1.38 | 11.30 | 9.76 | 2.6 | 90.4 | 99.5 |

Electrolysis sequence same as electrolysis sequence in Example 1.

What is claimed is:

1. A process for separating a metal from gangue constituents in a mineral comprising adding to the mineral an alkali metal halide and an alkali metal silicate, heating the mixture to a temperature and for a time sufficient to form a halide phase containing the desired metal and a silicate phase containing the gangue constituents, and separating the two phases.

2. The process of claim 1 in which the metal is tungsten.

3. The process of claim 1 in which the mineral is selected from the group consisting of scheelite and wolframite.

4. The process of claim 1 in which the alkali metal halide is selected from the group consisting of sodium chloride, potassium chloride, sodium fluoride, and alkali metal aluminum fluoride.

5. The process of claim 1 in which the alkali metal silicate is sodium silicate.

6. The process of claim 1 in which the mixture is heated to about 900° to 1100° C. for about 1 hour.

7. The process of claim 1 in which alumina is added to the mixture to promote the retention of calcium in the lower phase.

8. The process in claim 1 in which the halide phase is separated from the silicate phase by decantation.

9. The process of claim 1 in which the metal is separated from the halide phase by electrolysis.

References Cited

UNITED STATES PATENTS

| | | | |
|---|---|---|---|
| 2,463,367 | 3/1949 | Fink et al. | 204—64 XR |
| 2,487,214 | 11/1949 | Berr | 204—64 |
| 2,554,527 | 5/1951 | Fink et al. | 204—64 |
| 2,913,379 | 11/1959 | Steinberg | 204—64 |

HOWARD S. WILLIAMS, *Primary Examiner.*

D. R. VALENTINE, *Assistant Examiner.*